(12) United States Patent
Yang et al.

(10) Patent No.: US 12,487,795 B2
(45) Date of Patent: Dec. 2, 2025

(54) SUB-CELL, MAC ARRAY AND BIT-WIDTH RECONFIGURABLE MIXED-SIGNAL IN-MEMORY COMPUTING MODULE

(71) Applicant: Reexen Technology Co., Ltd., Guang Dong (CN)

(72) Inventors: Minhao Yang, Zürich (CH); Hongjie Liu, Guangdong (CN); Alonso Morgado, Villach (AT); Neil Webb, Kilchberg (CH)

(73) Assignee: Reexen Technology Co., Ltd., Guang Dong (CN)

( * ) Notice: Subject to any disclaimer, the term of this patent is extended or adjusted under 35 U.S.C. 154(b) by 910 days.

(21) Appl. No.: 17/631,723

(22) PCT Filed: Mar. 30, 2021

(86) PCT No.: PCT/CN2021/084032
§ 371 (c)(1),
(2) Date: Jan. 31, 2022

(87) PCT Pub. No.: WO2021/223547
PCT Pub. Date: Nov. 11, 2021

(65) Prior Publication Data
US 2022/0276835 A1 Sep. 1, 2022

(30) Foreign Application Priority Data
May 8, 2020 (CN) .......................... 202010382467.2

(51) Int. Cl.
*G06F 7/544* (2006.01)
*G06N 3/063* (2023.01)
(Continued)

(52) U.S. Cl.
CPC ........... *G06F 7/5443* (2013.01); *G06N 3/063* (2013.01); *G06N 3/065* (2023.01); *G11C 11/412* (2013.01); *G11C 11/419* (2013.01)

(58) Field of Classification Search
CPC ..... G11C 11/54; G11C 11/412; G11C 11/419; G06N 3/063; G06N 3/065; G06F 17/153; G06F 17/16; G06F 7/5443
See application file for complete search history.

(56) References Cited

U.S. PATENT DOCUMENTS

| 2012/0119808 | A1 | 5/2012 | Motozawa et al. |
| 2013/0194120 | A1 | 8/2013 | El-Chammas |

(Continued)

FOREIGN PATENT DOCUMENTS

| CN | 101807923 | 8/2010 |
| CN | 102394102 | 3/2012 |

(Continued)

OTHER PUBLICATIONS

X. Zhang, ECEN 248—Introduction to Digital Systems Design (Spring 2008)(Sections: 501,502,503,507), ECE Dept, http://dropzone.tamu.edu/~xihang/ECEN248 (Year: 2008).*

(Continued)

*Primary Examiner* — Emily E Larocque
(74) *Attorney, Agent, or Firm* — Dority & Manning, P.A.

(57) ABSTRACT

A mixed-signal in-memory computing sub-cell requires only 9 transistors for 1-bit multiplication. In one aspect, a computing cell is constructed from a plurality of such sub-cells that share a common computing capacitor and common transistors. As a result, the average number of transistors in each sub-cell is close to 6. Also proposed is a MAC array for performing MAC operations, which includes a plurality of the computing cells each activating the sub-cells therein in a time-multiplexed manner. Also proposed is an in-memory (Continued)

mixed-signal computing module for digitalizing parallel analog outputs of the MAC array and for performing other tasks in the digital domain.

19 Claims, 9 Drawing Sheets

(51) Int. Cl.
  *G06N 3/065* (2023.01)
  *G11C 11/412* (2006.01)
  *G11C 11/419* (2006.01)

(56) References Cited

U.S. PATENT DOCUMENTS

| | | | |
|---|---|---|---|
| 2014/0133218 | A1 | 5/2014 | Liaw |
| 2019/0080231 | A1* | 3/2019 | Nestler ............... G11C 11/419 |
| 2020/0105337 | A1* | 4/2020 | Chen .................. G11C 11/412 |
| 2021/0005230 | A1* | 1/2021 | Wang ................. G11C 11/412 |
| 2021/0349689 | A1* | 11/2021 | Lu ............................ G11C 5/02 |

FOREIGN PATENT DOCUMENTS

| | | |
|---|---|---|
| CN | 110414677 | 11/2019 |
| CN | 110598858 | 12/2019 |
| CN | 110941185 | 3/2020 |
| CN | 111144558 | 5/2020 |
| CN | 111431536 | 7/2020 |
| EP | 3989445 A1 | 4/2022 |
| WO | WO 2019/246064 A1 | 12/2019 |
| WO | WO 2021/178660 A1 | 9/2021 |

OTHER PUBLICATIONS

Jiang et al., "C3SRAM: In-Memory-Computing SRAM Macro Based on Capacitive-Coupling Computing", Solid-State Circuits Letters, vol. 2, No. 9, Sep. 2019, pp. 131-134.

Supplementary European Search Report for corresponding Application No. EP 21800372, dated Jul. 8, 2022, 11 pages.

PCT International Search Report (w/ English translation) for corresponding PCT Application No. PCT/CN2021/084032, mailed on Jun. 24, 2021—6 pages.

Valavi et al., "A Mixed-Signal Binarized Convolutional-Neural-Network Accelerator Integrating Dense Weight Storage And Multiplication For Reduced Data Movement," 2018 IEEE Symposium on VLSI Circuits, Honolulu, HI, USA, Jun. 18-22, 2018, DOI: 10.1109/VLSIC.2018.8502421—2 pages.

Jia et al, "A Microprocessor Implemented In 65nm CMOS With Configurable And Bit-Scalable Accelerator For Programmable In-Memory Computing," IEEE Journal of Solid-State Circuits, vol. 55, No. 9, pp. 2609-2621, Sep. 2020, arXiv: 1811.04047—10 pages.

Bankman et al. "An always-on 3.8μJ/86% CIFAR-10 mixed-signal binary CNN processor with all memory on chip in 28nm CMOS," IEEE Journal of Solid-State Circuits, vol. 54 Issue: 1, Jan. 2019, DOI: 10.1109/ISSCC.2018.8310264—15 Pages.

Biswas et al., "Conv-RAM: an energy-efficient SRAM with embedded convolution computation for low-power CNN-based machine learning applications," 2018 IEEE International Solid-State Circuits Conference—(ISSCC), Feb. 11-15, 2018, San Francisco, CA, USA, DOI: 10.1109/ISSCC.2018.8310397—11 pages.

* cited by examiner

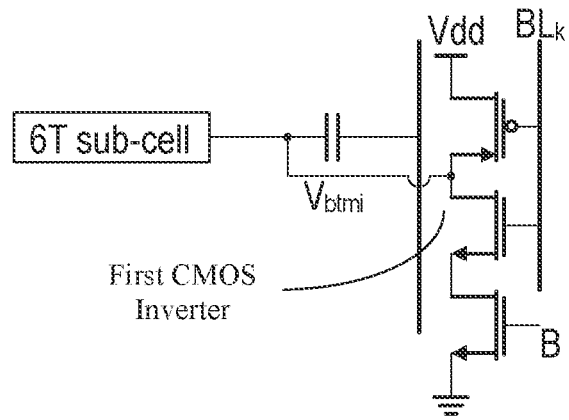
Fig. 2b
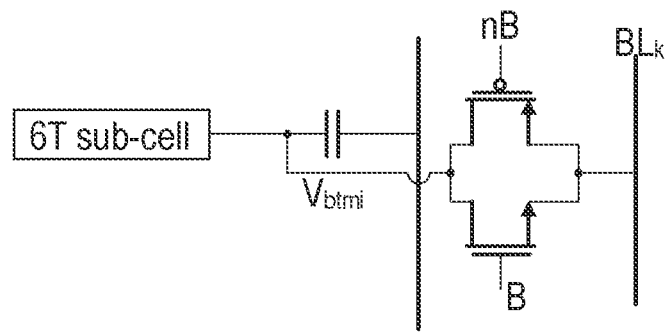
Fig. 2c
| Stored | Input | | | Output |
|---|---|---|---|---|
| W | A | nA | B | $V_{btm}$ |
| 0 | 0 | 1 | 1 | 0 |
| 0 | 1 | 0 | 0 | 0 |
| 1 | 0 | 1 | 1 | 0 |
| 1 | 1 | 0 | 0 | 1 |
Fig. 2d

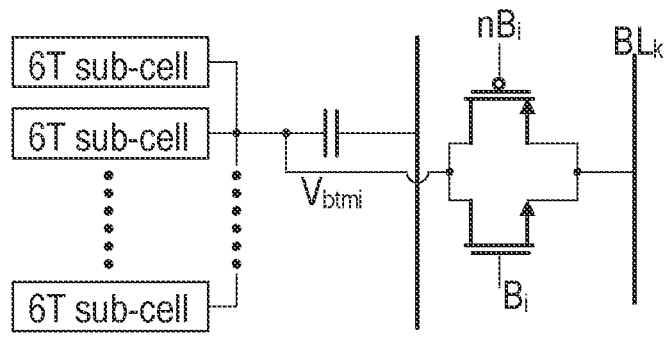
Fig. 3d
| Stored | Input | | | Output |
|---|---|---|---|---|
| $W_{0a}$ | $A_{0a}$ | $nA_{0a}$ | B | $V_{btm0}$ |
| 0 | 0 | 1 | 1 | 0 |
| 0 | 1 | 0 | 0 | 0 |
| 1 | 0 | 1 | 1 | 0 |
| 1 | 1 | 0 | 0 | 1 |
Fig. 3e
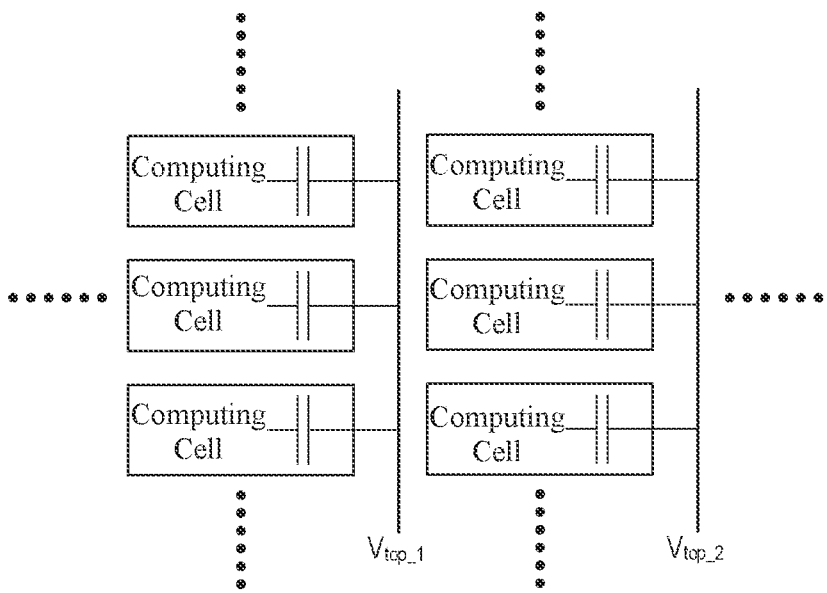
Fig. 4
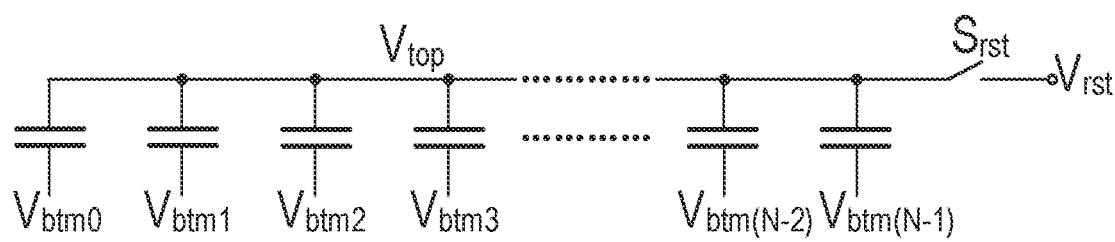
Fig. 5

SUB-CELL, MAC ARRAY AND BIT-WIDTH RECONFIGURABLE MIXED-SIGNAL IN-MEMORY COMPUTING MODULE

This application is a National Phase Application of International Application No. PCT/CN2021/084032, filed Mar. 30, 2021, which, in turn, claims the priority of Chinese Patent Application No. 202010382467.2, filed in the China National Intellectual Property Administration on May 8, 2020, entitled "Sub-cell, MAC Array, Bit-width Reconfigurable Mixed-signal In-memory Computing Module", both of which are hereby incorporated herein by reference in their entirety.

TECHNICAL FIELD

The present invention relates to the field of mixed-signal in-memory computing and, more specifically, to a sub-cell, a MAC array and a bit-width reconfigurable mixed-signal in-memory computing module.

BACKGROUND

Existing mobile and emerging edge applications like the Internet of Things call for high energy efficiency and high throughput per unit area. High energy efficiency means longer battery life, and high throughput per unit area means reduced area with a specified throughput, and in turn reduced cost. Nowadays, the feedforward inference computation in deep neural networks (DNN) is dominated by multiply-accumulate (MAC) operations, which require energy- and area-efficient implementation of MAC and reduced movement of the data to be processed. MAC implementation with traditional digital integrated circuits has a variety of advantages such as high tolerance to noise, high accuracy, good scalability and well-established design methodologies, but it is not suitable to implement high energy-efficient large-scale neural networks due to the digital circuits' large chip areas and high power consumption. Moreover, the bottleneck of data exchange between memory and central processing unit (CPU) in Von Neumann architectures employed in the traditional digital circuits poses severe limitations on computing energy efficiency and computing speed for massive data movement in DNN applications. MAC implementation with analog circuits is advantageous in structural simplicity and low power dissipation. Therefore, analog and mixed-signal computation has a potential in achieving high energy efficiency. The implementation of in-memory computing which has been proposed to overcome the bottleneck in Von Neumann architectures and drawn much attention recently is impossible in nature only by digital circuits, and the support of analog circuits is indispensable. Further, DNN application-specific integrated circuits (ASIC) are regaining the attention because of DNN's tolerance to circuit noise including computation errors.

As taught in "A mixed-signal binarized convolutional-neural-network accelerator integrating dense weight storage and multiplication for reduced data movement", DOI: 10.1109/VLSIC.2018.8502421 (identified hereinafter as "Literature 1") and "A Microprocessor implemented in 65 nm CMOS with configurable and bit-scalable accelerator for programmable in-memory computing", arXiv: 1811.04047 (identified hereinafter as "Literature 2"), a 1-bit MAC operation consists of a multiplication portion equivalent to XNOR operations of 1-bit weights and a 1-bit input, whose results are stored in the form of voltages in capacitors, and an accumulation portion that obtains a result of the 1-bit MAC operation through equal sharing of a constant total amount of charge among the capacitors. Each 1-bit computing cell involved in this 1-bit MAC operation has 10 transistors. These conventional techniques described in Literatures 1 and 2 are associated with the following problems: (1) the transmission gate in each computing cell is unconditionally driven for every accumulation operation, disallowing the sparsity of input data to be utilized for power savings; (2) each 1-bit multiplication cell is separately equipped with an individual capacitor, and the metal-oxide-metal (MOM) capacitors of the successive approximation register (SAW) analog-to-digital converters (ADCs) are located outside of the computing static random access memory (SRAM) array because there is no space inside the array, which reduces the area efficiency; and (3) the accumulation operation through charge sharing requires connecting the top plates of the capacitors that store the XNOR operation results. This circuit topology makes the accumulation vulnerable to non-ideal effects like charge injection, clock feedthrough, non-linear parasitic capacitance at the drains/sources of the transmission gate transistors, and leakage of the transistors connected to the capacitors' top plates, which result in computation errors. Further, the mismatch between the computing capacitors and digital-to-analog converter (DAC) capacitors in the ADCs resulted from physical layout mismatch can also result in computation errors.

In "An always-on 3.8 µJ/86% CIFAR-10 mixed-signal binary CNN processor with all memory on chip in 28 nm CMOS", DOI: 10.1109ISSCC.2018.8310264 (hereinafter "Literature 3"), there is proposed a computing module only supporting binarized neural networks (BNN) with both weights and activations in binary representation. This computing module has the following shortcomings: (1) it has a limited scope of application because it only supports BNN and cannot be used in large DNN models for vision applications like object detection; and (2) 1-bit multiplication requires many transistors including at least one OR gate, two XNOR gates, two NOR gates and one latch, which take up a large area.

In "Conv-RAM: an energy-efficient SRAM with embedded convolution computation for low-power CNN-based machine learning applications". DOI: 10.11.09/ISSCC.2018.8310397 (hereinafter "Literature 4"), there is proposed an energy-efficient SRAM with embedded convolution computation. This SRAM has the following deficiencies: (1) each 1-bit computing SRAM cell has 10 transistors, and the higher the number of transistors in each unit, the smaller the storage density; (2) it utilizes the parasitic capacitance on bit lines to store charge for the subsequent averaging operation, and the bit line parasitic capacitance is not well modeled and may suffer from larger mismatch compared to explicit capacitors like MOM capacitors, leading to inferior computation accuracy; (3) the horizontal charge averaging method used requires 6 extra transistors shared among several rows of cells, which limits the throughput because not all rows can perform the computation simultaneously; (4) the common-mode voltage on the differential charge averaging lines $Vp_{AVG}$ and $Vn_{AVG}$ is dependent on the magnitude of the input data $X_{in}$ and is inconstant after averaging assessment using a local MAV circuit, so energy-efficient high-speed ADCs like SAR ADC cannot be easily used, and instead a ramp-based ADC that takes maximum $2^N-1$ (N is the ADC resolution) steps to converge is used, which compromises the computation throughput; and (5) the input of the array uses an explicit DAC circuit to convert the input data $X_{in}$ (usually feature maps) from digital to analog representation, the non-ideal characteristics of which can lead to additional accuracy loss, and area and energy overhead.

In summary, the conventional MAC arrays are suffering from the following problems: each computing cell for 1-bit multiplication has many transistors; there is an one-to-one correspondence between capacitors storing the multiplication results to be accumulated and memory elements, i.e., the number of memory elements is equal to that of capacitors, but as one capacitor's area may be much larger than that of one SRAM cell, the capacitors can take up a significant proportion of the MAC array area, in particular when an advanced process is used; the transistors are unconditionally driven for every accumulation operation, leading to inferior energy efficiency; and a high rate of computation errors leads to a limited scope of application.

Therefore, in the field of mixed-signal in-memory computing, there is an urgent need for a bit-width reconfigurable mixed-signal in-memory computing module with a reduced area, high energy efficiency and good error tolerance.

SUMMARY

In view of the above, it is an object of the present invention to provide a sub-cell, a MAC array and a bit-width reconfigurable mixed-signal in-memory computing module. It is another object of the present invention to reduce computation errors by providing a differential version of the MAC array. These objects are attained by the following inventive aspects.

In a first aspect, there is provided an in-memory mixed-signal computing sub-cell comprising a memory element, a computing capacitor and a control element,
the memory element comprising two cross-coupled CMOS inverters and a complementary transmission gate, the two cross-coupled CMOS inverters storing a 1-bit filter parameter, the complementary transmission gate comprising an NMOS transistor comprising a gate connected to an input signal, the complementary transmission gate further comprising a PMOS transistor comprising a gate connected to a complementary input signal, one of the CMOS inverters comprising an output connected to an input of the complementary transmission gate, the complementary transmission gate comprising an output connected to both a bottom plate of the computing capacitor and the control element,
wherein a multiplication result of the input signal and the filter parameter is stored as a voltage on the bottom plate of the computing capacitor, and
a plurality of the sub-cells are arranged to form a computing cell in such a manner that the control element and the computing capacitor are shared among all the sub-cells in the computing cell.

In this design, the 1-bit filter parameter or weight is written into and stored in the two cross-coupled CMOS inverters, and the input signal A is connected to the gate of the NMOS transistor in the complementary transmission gate. Additionally, the gate of the PMOS transistor in the complementary transmission gate is connected to the complementary input signal nA, and the multiplication result of the input signal A and the weight w is stored as the bottom plate voltage of the computing capacitor. A plurality of such sub-cells are arranged to form a computing cell in such a manner that the control element and the computing capacitor are shared among all the sub-cells in the computing cell. The sub-cells may be arranged in a feasible shape such as 2×2, 4×2, etc. Intuitively, this arrangement reduces the number of control elements composed of MOS transistors. For example, a 2×2 shape of sub-cells leads to a number of control elements reduced by 3 and a number of computing capacitors reduced by 3.

In some embodiments, the control element may comprise a first NMOS transistor, a second NMOS transistor and a PMOS transistor. A gate of the first NMOS transistor may be connected to a signal B. In particular, during computation in the computing sub-cell, the complementary input signal nA may be at the same voltage level as the signal B. The input of the complementary transmission gate is connected to an output of one CMOS inverter in the two cross-coupled CMOS inverters. A source of the second NMOS transistor may be grounded Gnd, and a gate thereof may be connected to a bit line. A source of the PMOS transistor may be connected to Vdd, and a gate thereof may be connected to another, complementary bit line. This topology can avoid unconditionally driving of the complementary transmission gate, resulting in improved energy efficiency. For example, when the signal B=0, complementary input signal nA=0, input signal A=1 and filter parameter w=1, the branch of the computing capacitor connecting the NMOS transistor is not conducting, while the branch of the computing capacitor connecting the complementary transmission gate is conducting. As a result, the multiplication result of the filter parameter w and the input signal A is stored as the bottom plate voltage $V_{btm}$ of the computing capacitor. In this way, the sub-cell for 1-bit multiplication (of the filter parameter w and the input signal) has only 9 transistors and thus a reduced area. The complementary transmission gate is avoided from being connected to a top plate of the computing capacitor for charge accumulation. This can minimize computation errors, in particular those caused by clock feedthrough introduced with MOS transistor switches, charge injection occurring during on-to-off switching, non-linear parasitic capacitance at the drains/sources of the transistors in the complementary transmission gate, leakage of the transistors themselves, etc.

On the basis of the first aspect and possible implementations thereof, in some embodiments, in order to reduce the number of used bit lines and facilitate physical wiring, the MOS transistors in the control element may be connected in another way in which the second NMOS transistor that the bottom plate of the computing capacitor is connected to may be connected in series with the PMOS transistor to form a first CMOS inverter. In these embodiments, the source of the PMOS transistor in the first CMOS inverter may be connected to Vdd, and the source of the second NMOS transistor in the first CMOS inverter may be connected to the drain of the first NMOS transistor. The source of the first NMOS transistor is grounded Gnd, and the input signal provided at the gate thereof may be of the same voltage level during computation as the signal connected to the gate of the PMOS transistor in the complementary transmission gate. An input of the first CMOS inverter may be connected to a bit line, and an output thereof may be connected to the bottom plate of the computing capacitor.

On the basis of the first aspect and possible implementations thereof, in some embodiments, in order to reduce the number of transistors in the computing cell and facilitate content readout from the memory element, the second NMOS transistor may be removed so that the control element contains only the first NMOS transistor and the PMOS transistor. The drain of the first NMOS transistor may be connected to the drain of the PMOS transistor, and both the drains may be connected to the bottom plate of the computing capacitor. The source of the first NMOS transistor may be connected to the source of the PMOS transistor, and both the sources may be connected to a bit line. The gate of the first NMOS transistor may be connected to a control word line at the same voltage level during computation as the gate of the PMOS transistor in the complementary transmission gate, and the gate of the PMOS transistor may be connected to another control word line.

On the basis of the first aspect and possible implementations thereof, the greater the number of sub-cells that share the MOS transistors in the control element and the computing capacitor, the smaller the area per sub-cell, and the closer the average number of transistors in each sub-cell to 6.

On the basis of the first aspect, in some embodiments, the sub-cells in the computing cell may be activated in a time-multiplexed manner where, when one of the sub-cells is activated, all the other sub-cells are deactivated, and the signal to which the gate of the first NMOS transistor is connected may be at the same voltage level as the level on the gate of the PMOS transistor in the complementary transmission gate of the one of the sub-cells that is active at a given time. After an in-memory computation is completed in one sub-cell, another in-memory computation can be immediately initiated in another sub-cell with a filter parameter stored therein, without waiting for the transfer of data from outside into the sub-cell. This results in enhancements in computation speed and throughput, and results in reductions in power consumption and area consumption.

In a second aspect, there is provided a multiply-accumulate (MAC) array for performing MAC operations, comprising the sub-cells according to the first aspect or possible implementations thereof. The MAC array comprises a plurality of computing cells, in each of which the outputs of the complementary transmission gates of all the sub-cells are connected to the bottom plate of the common computing capacitor, wherein top plates of the computing capacitors in all the computing cells of each column are connected to a respective accumulation bus, and wherein a voltage on each accumulation bus corresponds to an accumulated sum of multiplication operation results of the respective column of the MAC array.

In this design, as the area of a single capacitor is generally as large as several times that of a SRAM cell, compared to other designs with each 1-bit multiplication sub-cell being separately equipped with an individual computing capacitor for storing a computation result, sharing both a control element composed of transistors and a computing capacitor among sub-cells, i.e., sharing of a computing capacitor for storing a computation result amongst multiple 1-bit multiplication sub-cells, can greatly improve the storage capacity per unit area. For in-memory computing, reducing data movement between inside and outside of the computing chip is the most important way to reduce power consumption. The MAC array of this design contains more cross-coupled CMOS inverters per unit area, which can store more filter parameters of a neural network at a time, reducing data movement.

On the basis of the second aspect, in some embodiments, the MAC array may further comprise second CMOS inverters and differential capacitors incorporated in the respective computing cells in the MAC array. In each of the computing cells, the outputs of the complementary transmission gates of all the sub-cells may be connected to an input of a respective one of the second CMOS inverters, which may be connected at an output thereof to a bottom plate of a respective one of the differential capacitors. Top plates of all the differential capacitors in each column may be connected to a respective differential accumulation bus.

In a third aspect, there is provided a bit-width reconfigurable mixed-signal MAC computing apparatus, comprising: the MAC array according to the second aspect or any possible implementation thereof, wherein column-wise accumulation results are represented in the form of analog voltages; a filter/ifmap block for providing filter parameters or activations from computation in the previous layer of a neural network, which are written into and stored in the MAC array; an ifmap/filter block for providing an input to the MAC array, which is subject to MAC operations with the filter parameters or the activations from computation in the previous layer of the neural network; an ADC block for converting the analog voltages from the MAC array to their digital representations; and a digital processing block for performing multi-bit fusion, biasing, scaling or nonlinearity on the digital representations output from the ADC block and outputting results in the form of partial sums or activations usable as an input to the next network layer.

In this design, the filter parameters or activations from computation in the neural network's previous layer are written into and stored in the MAC array via the filter/ifmap block so that logic 1 or 0 is stored in each of the cross-coupled CMOS inverter pairs of the sub-cells, and are subject to MAC operations with the input provided by the ifmap/filter block. In this process, the stored values in the sub-cells are multiplied with the input by digital operations that are equivalent to AND operations, and the multiplication results are stored in the computing capacitors. In the accumulation portion, as the top plates of the computing capacitors in each column are connected together by a respective accumulation bus, charge stored in the computing capacitors is shared via the accumulation bus. The column-wise accumulation results are represented in the form of analog voltages, which are then converted into their digital representations by the ADC block. The digital representations are processed, and the final output results are partial sums or activations usable as an input to the next network layer. In contrast to traditional digitally-implemented MAC operations in neural networks which consume much power, the mixed-signal MAC operations in this design can greatly reduce power consumption, and the reduced area implementation of the MAC array can result in improved energy efficiency and a faster computation speed. Using different combinations of operations in different phases of computation in neural networks allows different benefits of analog and digital operations to be effectively taken advantage of to ensure low computational power consumption, high energy efficiency, a high speed and high accuracy.

On the basis of the third aspect, in a possible implementation, the ADC block may be implemented as SAR ADCs, in particular binarily weighted capacitive SAR ADCs.

On the basis of the third aspect and the first possible implementation, in a second possible implementation, the sparsity of the MAC array's input and stored values may spare some capacitors in the SAR DACs from switching in order to achieve higher energy efficiency and faster analog-to-digital conversion. In other words, a bit-width of the SAR ADC for each column in the MAC array may be determined in real time by the sparsity of the input and stored values.

On the basis of the third aspect or possible implementations thereof, in a third possible implementation, each SAR DAC may be connected together with a MAC DAC. It will be appreciated that the MAC DAC is a respective column of computing capacitors in the MAC array. Thus, the capacitors in the column of the MAC array may be connected in parallel with capacitors in the SAR DAC.

On the basis of the third aspect or possible implementations thereof, in other implementations, the reuse of the MAC DAC as the SAR DAC is allowed via bottom-plate sampling. In this way, both MAC operation and analog-to-digital conversion can be accomplished with a single capacitor array, avoiding mismatch and accuracy loss caused by the use of separate capacitor arrays for the MAC DAC for performing MAC operations and the SAR DAC for achieving analog-to-digital conversion, allowing the possibility of fully-differential SAR ADC, and better solving the problem of common-mode dependent comparator input offset voltage.

BRIEF DESCRIPTION OF THE DRAWINGS

FIG. 2b is a structural schematic of a sub-cell according to another embodiment of the present invention;

FIG. 2c is a structural schematic of a sub-cell according to a further embodiment of the present invention;

FIG. 2d schematically illustrates a truth table for 1-bit multiplication sub-cells according to an embodiment of the present invention;

FIG. 3d is a schematic illustration of a computing cell composed of a plurality of sub-cells according to a further embodiment of the present invention;

FIG. 3e schematically illustrates a truth table for sub-cells in a computing cell according to an embodiment of the present invention;

FIG. 4 is a schematic illustration of a MAC array containing computing cells according to an embodiment of the present invention;

FIG. 5 schematically illustrates bottom and top plate voltages of a computing capacitor according to an embodiment of the present invention;

DETAILED DESCRIPTION

The objects, principles, features and advantages of the present invention will become more apparent from the following detailed description of embodiments thereof, which is to be read in connection with the accompanying drawings. It will be appreciated that the particular embodiments disclosed herein are illustrative and not intended to limit the present invention, as also explained somewhere else herein.

It is particularly noted that, for the brevity of illustration, some connections or positional relationships that can be inferred from the text of this specification or the teachings disclosed herein are omitted in the figures, or not all positional changes are depicted. Such positional changes that are not clearly described or illustrated should not be considered as having not taken place. As collectively clarified here, this will not be explained separately in the following detailed description, for the sake of conciseness.

Additionally, the use of the terms "first", "second", etc. herein is intended for illustration only and is not to be construed as denoting or implying relative importance or as implicitly indicating the numerical number of the referenced item.

As a common application scenario, bit-width reconfigurable mixed-signal computing modules provided in embodiments of the present invention can be used in visual and acoustic DNN architectures, in particular in object detection, acoustic feature extraction with low power consumption, etc.

For example, in the case of feature extraction, after the data to be processed is convolved with a filter consisting of weights provided in a feature extractor, the corresponding feature maps/activations are output. Depending on the filter selected, different features may be extracted. In this process, the convolution operation of the data to be processed with the filter is most power-consuming, necessitating the avoidance of power consumption in unconditional circuit driving or the like, in particular when the data to be processed is a sparse matrix.

Figure 1A:
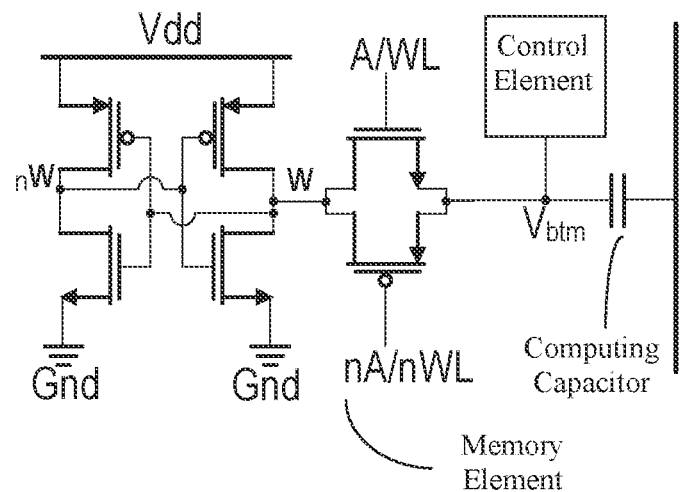
FIG. 1a is a schematic diagram illustrating a sub-cell according to an embodiment of the present invention.

In this application, there is provided a sub-cell for use in in-memory computing as shown in FIG. 1a, which includes a memory element, a computing capacitor and a control element. The memory element includes two cross-coupled CMOS inverters and a complementary transmission gate. The two cross-coupled CMOS inverters store a 1-bit filter parameter. A gate of an NMOS transistor in the complementary transmission gate is connected to an input signal A, and a gate of a PMOS transistor in the complementary transmission gate is connected to a complementary input signal nA. An output of one of the CMOS inverters is connected to an input of the complementary transmission gate, and an output of the complementary transmission gate is connected to both a bottom plate of the computing capacitor and the control element. It should be noted that the complementary transmission gate is a bidirectional device and the input of the complementary transmission gate as mentioned herein refers to the terminal connected to the output of said CMOS inverter. The NMOS and PMOS gates of the complementary transmission gate may be connected to word line signals WL and nWL, respectively, to allow a weight w to be written in or read out from the sub-cell. Alternatively, they may be respectively connected to the input signal A and the complementary input signal nA to participate in 1-bit multiplication. In FIG. 1a, W and nW are the abbreviations of "weight" and "negative weight" and represent weighting and negative weighting locations, respectively.

A multiplication result of the input signal A and the weight w is stored as a voltage $V_{btm}$ on the computing capacitor's bottom plate.

Figure 1B:
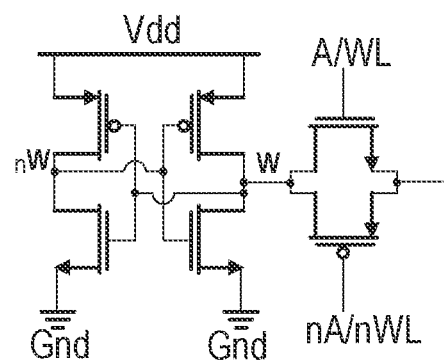
FIG. 1b is a schematic illustration of a 6T structure in the sub-cell according to an embodiment of the present invention.

For ease of description, the bottom plate of the computing capacitor is defined as the plate thereof connected to the complementary transmission gate, while the top plate of the computing capacitor is defined as the plate connected to an accumulation bus. A memory element consisting of two cross-coupled CMOS inverters connected to a complementary transmission gate is referred to as a 6T structure (or 6T sub-cell, as it contains six transistors), as shown in FIG. 1b.

A plurality of the sub-cells may form a computing cell such that the control element and the computing capacitor are shared among all the computing sub-cells in the computing cell.

Figure 2A:
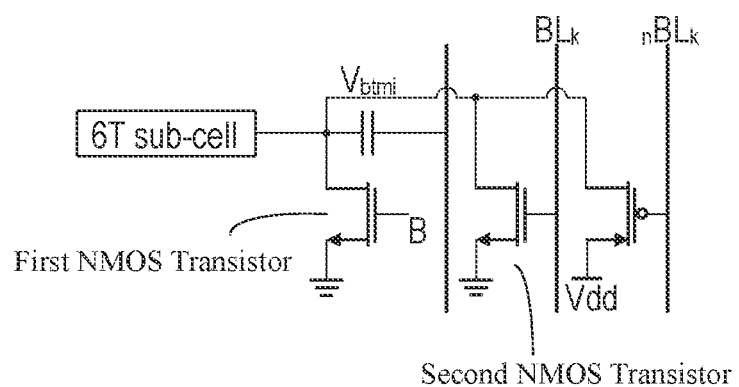
FIG. 2a is a structural schematic of a sub-cell according to an embodiment of the present invention.

FIG. 2a is a structural schematic of an embodiment of the 1-bit multiplication sub-cell. As shown, the control element includes a first NMOS transistor, a second NMOS transistor and a PMOS transistor. A source of the first NMOS transistor is grounded Gnd, and a drain thereof is connected to the common bottom plate of the shared computing capacitor, together with a drain of the second NMOS transistor, a drain of the PMOS transistor and the output of the complementary transmission gate. With the gate of the NMOS transistor in the complementary transmission gate being connected to the input signal A, the gate of the first NMOS transistor is provided thereat with a signal B at the same voltage level during computation as the complementary input signal nA to which the gate of the PMOS transistor in the complementary transmission gate is connected. A source of the second NMOS transistor is grounded Gnd, and a gate thereof is connected to a bit line $BL_k$. A source of the PMOS transistor is connected to Vdd, and a gate thereof is connected to another bit line $nBL_k$.

In some possible embodiments, the complementary input signal nA and the signal B may have the same voltage level by sharing a common node. It will be appreciated that the signal B provided at the gate of the first NMOS transistor not only resets a bottom plate voltage of the computing capacitor and thus prepares the sub-cells for the next operation, but also participates in a 1-bit multiplication operation, as indicated in the truth table shown in FIG. 2, which is performed between the filter parameter or weight w written into and stored in the two cross-coupled CMOS inverters and the input signal A at the NMOS gate of the complementary transmission gate. A multiplication result is stored as a voltage on the bottom plate of the computing capacitor. For example, the complementary transmission gate in the sub-cell is used to control the writing of w, requiring the word line signals received respectively at the NMOS and PMOS gates of the complementary transmission gate to ensure that the complementary transmission gate is conducting. Specifically, the word line WL to which the NMOS gate of the complementary transmission gate is connected is set to Vdd, and the other word line nWL to which the PMOS gate of the complementary transmission gate is connected is set to 0. In order to write "0", the bit line $BL_k$ and $nBL_k$ are both set at a high voltage level. As a result, the second NMOS transistor is on, and the PMOS transistor is off. In order to write "1", the bit line $BL_k$ and $nBL_k$ are both set at a low voltage level. As a result, the second NMOS transistor is off, and the PMOS transistor is on. In order to enable in-memory computing in the complementary transmission gate, $BL_k$ is set at a low voltage level and $nBL_k$ is set at a high voltage level, ensuring that the multiplication result from the in-memory computing is stored in the computing capacitor.

Too many bit lines may pose a great challenge to physical wiring. In order to reduce the number of necessary bit lines and facilitate physical wiring, in other embodiments, the bit line design in the control element of the above sub-cell may be optimized, as shown in FIG. 2b. Specifically, the optimized control element also includes the first NMOS transistor, the second NMOS transistor and the PMOS transistor, but in contrast to the embodiment of FIG. 2a, the second NMOS transistor and the PMOS transistor are connected in series to form a first CMOS inverter, in which the source of the PMOS transistor is connected to Vdd, and the source of the second NMOS transistor is connected to the drain of the first NMOS transistor. Additionally, the source of the first NMOS transistor is grounded Gnd, and the gate thereof is provided with an input signal at the same voltage level during computation as the signal to which the gate of the PMOS transistor in the complementary transmission gate is connected. An input of the first CMOS inverter is connected to a bit line, and an output thereof is connected to the bottom plate of the computing capacitor. In this embodiment, in order to write the filter parameter or weight into the 6T structure, the bit lines $BL_k$ and B are both set high, if "0" is to be written; the bit line $BL_k$ is set low, if "1" is to be written. In order to enable in-memory computing, $BL_k$ is set high, and the signal B and complementary input signal nA are kept at the same level.

In order to additionally reduce the number of transistors in the sub-cell, in further embodiments, the second NMOS transistor may be removed from the embodiments of FIGS. 2a and 2b so that there are only two transistors in the control unit of the sub-cell, as shown in FIG. 2c. In this embodiment, the drain of the first NMOS transistor is connected to both the drain of the PMOS transistor and the bottom plate of the computing capacitor. The source of the first NMOS transistor and the source of the PMOS transistor are connected to a hit line. The gate of the first NMOS transistor is connected to a word line signal B, which is in particular at the same voltage level during computation as that at the gate of the PMOS transistor in the complementary transmission gate in the 6T structure. The gate of the PMOS transistor is connected to another word line signal nB. In this embodiment, in order to write the filter parameter or weight into the 6T structure, the bit line $BL_k$ is set at a low voltage level and B is set at a high voltage level, if "0" is to be written; the bit line $BL_k$ is set at a high voltage level and nB is set at a low voltage level, if "1" is to be written. In order to enable in-memory computing, $BL_k$ is set at a low voltage level, B is kept at the same voltage level as the complementary input signal nA, and nB is set at a high voltage level. As can be appreciated, the sub-cell according to this embodiment can accomplish a 1-bit multiplication operation with only 8 transistors.

Optionally, the sub-cell may follow the procedures below to perform a 1-bit multiplication operation:

1. Reset a top plate voltage $V_{top}$ of the computing capacitor to $V_{rst}$ through a reset switch $S_{rst}$ on the accumulation bus.

2. Conduct the first NMOS transistor in the sub-cell by raising the signal B at its gate to Vdd, thus resetting the bottom plate voltage $V_{btm}$ of the capacitor to 0, keep the input signals A and nA in the complementary transmission gate of the sub-cell at 0 and Vdd, respectively, and disconnect $S_{rst}$ after $V_{btm}$ is reset to 0.

3. During computation, activate the signals A and nA in the sub-cell according to the truth table of the 1-bit multiplication operation as shown in FIG. 2.

4. After the multiplication operation in the sub-cell is completed, either maintain the bottom plate voltage $V_{btm}$ of the computing capacitor at 0 or raise it to Vdd, and output a result of the multiplication operation as the computing capacitor's bottom plate voltage $V_{btm}$, expressed as Vdd× w×A.

It will be appreciated that the sub-cell accomplishes the 1-bit multiplication operation (of the filter parameter w and the input signal A) with only 9 or 8 transistors, thus having a reduced sub-cell area and higher energy efficiency when compared to the conventional techniques. Instead of connecting the transmission gate to the top plate of the computing capacitor as conventionally practiced, connecting it to the bottom plate of the computing capacitor can minimize computation errors, in particular those caused by clock feedthrough introduced with MOS transistor switches, charge injection occurring during on-to-off switching, non-linear parasitic capacitance at the drains/sources of the transistors in the complementary transmission gate, leakage of the transistors themselves, etc.

Figure 3A:
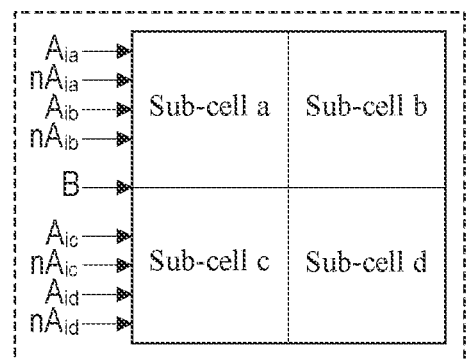
FIG. 3a is a schematic diagram illustrating an arrangement of sub-cells in a computing cell according to an embodiment of the present invention.
Figure 3B:
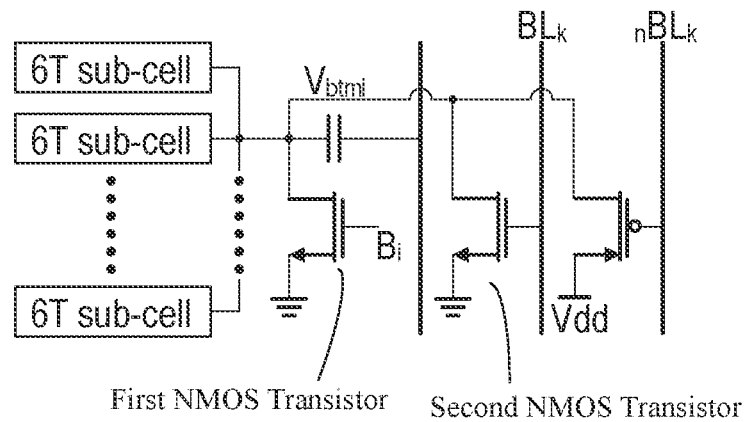
FIG. 3b is a schematic illustration of a computing cell composed of a plurality of sub-cells according to an embodiment of the present invention.
Figure 3C:
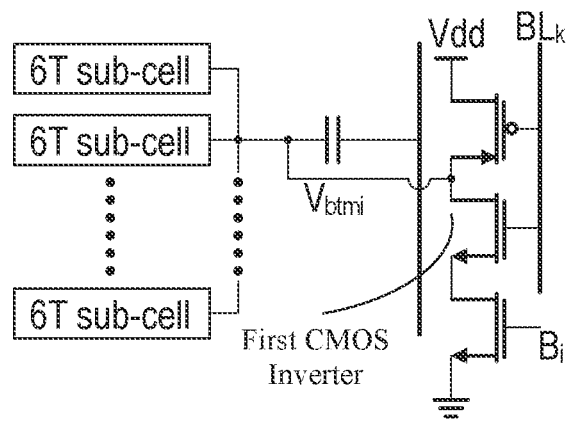
FIG. 3c is a schematic illustration of a computing cell composed of a plurality of sub-cells according to another embodiment of the present invention.

A plurality of the sub-cells of the above embodiments may be arranged in a feasible shape such as 2×2, 4×2, etc., as shown in FIG. 3a, to form a computing cell. Intuitively, this arrangement reduces the numbers of necessary computing capacitors and MOS transistors in the control element. For example, a 2×2 shape of 4 sub-cells leads to a number of control elements reduced by 3 and a number of computing capacitors reduced by 3. FIGS. 3b, 3c and 3d show computing cell embodiments composed of the sub-cells as described above. In such a computing cell consisting of a plurality of sub-cells, each sub-cell retains its own 6T structure, and all the sub-cells share a common control element and a common computing capacitor. That is, every such computing cell contains only one control element and one computing capacitor. Intuitively, this sharing arrangement reduces the numbers of necessary control elements and computing capacitors, when compared to the case where the same number of individual sub-cells is involved. For example, in the computing cell of FIG. 3b, the multiple sub-cells commonly share one computing capacitor, one first NMOS transistor, one second NMOS transistor and one PMOS transistor, and the output of the complementary transmission gate in each sub-cell is connected to the drain of the common first NMOS transistor, the bottom plate of the common computing capacitor, the drain of the common PMOS transistor, and the drain of the common second NMOS transistor. It should be noted that since the control element is generally composed of transistors, the greater the number of sub-cells that share a common control element, the closer the number of necessary transistors in each sub-cell to the number of necessary transistors in the memory element, i.e., the 6T structure.

Moreover, as the area of a single capacitor is generally as large as several times that of the 6T structure, compared to each 1-bit multiplication sub-cell being separately equipped with an individual capacitor for storing a computation result, the arrangement with multiple 1-bit multiplication sub-cells sharing a single capacitor can greatly improve the storage capacity in a specified area. That is, more filter parameters or weights can be stored per area at a time, compared to the conventional techniques.

Additionally, the sub-cells in the computing cell may be activated in a time-multiplexed manner. That is, when any sub-cell is activated, all the other sub-cells are deactivated. The activated sub-cell can perform a 1-bit multiplication operation in the way as described above according to the truth table in FIG. 3e, where $W_{0a}$ denotes a numerical value stored at a weighting location of a sub-cell a in the 0-th computing cell in one column, and $V_{btm0}$ represents a bottom plate voltage of the 0-th computing cell in the column. More specifically, in some embodiments, the signals at the NMOS and PMOS gates of the complementary transmission gates in the sub-cells are denoted as $A_{ij}$ and $nA_{ij}$, respectively, where i is the index of cells in a column and is a non-negative integer from 0 to n−1, and j is the index of sub-cells in each cell and j=a, b, c, d in the 2×2 sub-cells example. It will be appreciated that sharing of transistors and a capacitor for the sub-cells means that a single computing cell includes multiple sub-cells capable of multiplication. It is noted that differing from separate individual sub-cells, when multiple sub-cells are arranged to form a single computing cell, the input signal at the gate of the first NMOS transistor is controlled separately from the input signal $nA_{ij}$ at the PMOS gate of the complementary transmission gate in each sub-cell. In the case of tune-multiplexing, although $nA_{ij}$ in the activated sub-cell at a given tune remains at the same voltage level as $B_i$, this is no longer realized by connection at a common node. In contrast to the same number of separate sub-cells, the computing cell saves the use of n−1 computing capacitors and n−1 control elements (and thus n−1 first NMOS transistors, n−1 second NMOS transistors and n−1 PMOS transistors are saved), making the number of transistors required for each sub-cell to perform a 1-bit multiplication operation closer to 6. Due to differences in the fabrication processes, the area of the computing capacitor is typically several times that of the 6T memory structure in each sub-cell. The sharing arrangement leads to a reduced number of capacitors per unit area, imparting higher storage capacity to a module made up of those computing cells. Further, in each computing cell, after an in-memory computation is completed in one sub-cell, another in-memory computation can be immediately initiated in another sub-cell with a filter parameter stored therein, without having to wait for the transfer of data from outside into the sub-cell. This results in an increased computation speed.

In a second aspect, a multiply-accumulate (MAC) array for MAC operation is provided on the basis of the sub-cells and computing cells of the first aspect. Referring to FIG. 4, the MAC array includes a plurality of the computing cells, and in each column of computing cells, the top plates of all the computing capacitors are connected to a respective accumulation bus. As can be understood from the above description, each computing cell includes at least one sub-cell, and the output of each complementary transmission gate in the computing cell is connected to the bottom plate of the common computing capacitor. A voltage on each accumulation bus corresponds to an accumulated sum of computation results of the respective column.

In contrast to an MAC array constructed from individual sub-cells, the computing cells with shared capacitors and transistors enable the MAC array to store more neural network parameters or computation results from the previous network layer. Specifically, the results of 1-bit multiplication operations in the computing cells are stored in the computing capacitors, and the 1-bit multiplication results from the computing cells of each column in the MAC array are accumulated by the respective accumulation bus to which the top plates of the computing capacitors are connected.

For in-memory computing, reducing data movement between inside and outside of the computing chip is a direct way to reduce power consumption. It will be appreciated that since the area of a single computing capacitor is several times that of a single memory cell, the computing capacitor-sharing arrangement allows the MAC array to contain more memory cells per unit area, which can store more filter parameters at a time compared to conventional techniques. In each cell, after an in-memory computation is completed in one sub-cell, another in-memory computation can be immediately initiated with a filter parameter stored in the two cross-coupled CMOS inverters of another sub-cell of the same cell, without waiting for the transfer of data from outside into the sub-cell. This results in significant enhancements in computation speed and throughput, and results in reductions in energy consumption and area consumption.

Referring to FIG. 5, in particular, as the top plates of the computing capacitors of each column are connected together through the respective accumulation bus, the voltage on the accumulation bus is $V_{top}$. It is clarified that the plurality of computing cells are column-wise arranged so that each computing cell corresponds to one computing capacitor and contains a plurality of sub-cells according to the first aspect or embodiments thereof.

In some embodiments, the MAC array may follow "Procedure I" below to perform a MAC operation:

1. First write filter parameters (or activations from computation in the previous network layer) into each sub-cell, and store them in the cross-coupled CMOS inverter pairs in the sub-cells following a write procedure.

2. Reset the top plate voltage $V_{top}$ of the computing capacitors to $V_{rst}$, which may be 0, through a reset switch $S_{rst}$ on the accumulation bus.

3. Reset the bottom plate voltages $V_{btmi}$ of the computing capacitors to 0 by raising the signal B in every computing cell to Vdd, keep the signals $A_{ij}$ and $nA_{ij}$ in every computing cell at 0 and Vdd, respectively, and disconnect $S_{rst}$.

4. During computation, activate the signals $A_{ij}$ and $nA_{ij}$ in a time-multiplexed manner. For example, when $A_{0a}$ and $nA_{0a}$ are activated, $A_{0j}$ and $nA_{0j}$ (j=b, c, d) are deactivated, i.e. kept at 0 and Vdd, respectively. It is to be noted that, during computation, $B_0$ in one computing cell is at the same voltage level as $nA_{0j}$ in the then activated sub-cell.

5. After the multiplication in each computing cell in a column is completed, either maintain the bottom plate voltages $V_{btmi}$ of the computing capacitors at 0, or raise them to Vdd. Charge redistribution occurs in the computing capacitors in the column, similar to the charge redistribution in capacitors of a successive approximation register (SAR) digital-to-analog converter (DAC), and when not considering non-idealities such as parasitic capacitance and so on, the analog output voltage $V_{top}$ of the computing capacitors in the column represents the accumulation result expressed in the equation below, as shown in FIG. 5.

$$V_{top} = \frac{VDD}{N}\sum_{i=0}^{N-1} W_{ij}A_{ij} (j = a, b, c, d)$$

In other embodiments, the MAC array may follow "Procedure II" below to perform an operation:

1. Write filter parameters activations from computation in the previous network layer) into the sub-cells.

2. Reset the top plate voltage $V_{top}$ of the computing capacitors to $V_{rst}$ through a reset switch $S_{rst}$ on the accumulation bus. $S_{rst}$ keeps the connection between $V_{top}$ and $V_{rst}$.

3. Reset the bottom plate voltages $V_{btmi}$ of the computing capacitors to 0 by raising the signal $B_i$ in every cell to Vdd and keep the signals and $A_{ij}$ and $nA_{ij}$ in every cell at 0 and Vdd, respectively.

4. During computation, activate the signals $A_{ij}$ and $nA_{ij}$ in a similar time-multiplexed manner.

5. After the multiplication in each computing cell in a column is completed, either maintain the bottom plate voltages $V_{btmi}$ of the computing capacitors at 0, or raise them to Vdd, and then disconnect $S_{rst}$. With the bottom plate voltages $V_{btmi}$ being set to 0 or Vdd, MOS switches in the control elements of the computing cells run a successive approximation algorithm for analog-to-digital conversion. As an example, if $V_{btmi}$ are all set to 0, the voltage $V_{top}$ can be expressed as:

$$V_{top} = V_{rst} - \frac{VDD}{N}\sum_{i=0}^{N-1} W_{ij}A_{ij} \ (j = a, b, c, d).$$

The second aspect or the MAC array of the second aspect may be in particular used in computation with multi-bit weights. In these cases, each column of computing cells performs a bit-wise MAC operation, and the multi-bit weights computation results can be obtained by performing shift-add operations on digital representations resulting from analog-to-digital conversion. For example, in the case of k-bit weights/filter parameters, each column may perform a bit-wise MAC operation, e.g., the first column for the least significant bit (LSB) (i.e., performing a MAC operation between the 0-th bit values and the input signals) and the k-th column for the most significant bit (MSB) (i.e., performing a MAC operation between the (k−1)-th bit values and the input signals). It will be appreciated that each column separately performs an MAC operation for one bit of multi-bit binary weights, and the MAC results of all the involved columns contain k elements, which are then subject to analog-to-digital conversion and shift-add operations in the digital domain.

Figure 6A:
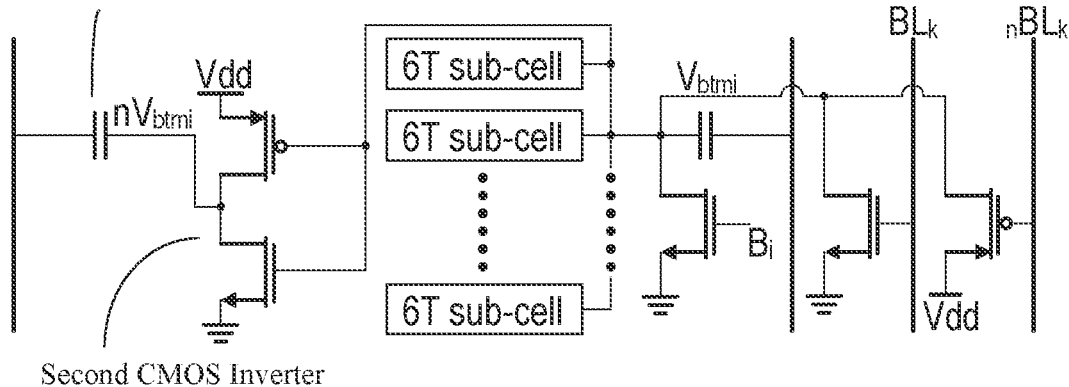
FIG. 6a is a schematic diagram illustrating a computing cell connected to a second CMOS inverter and a differential capacitor according to an embodiment of the present invention.
Figure 6B:
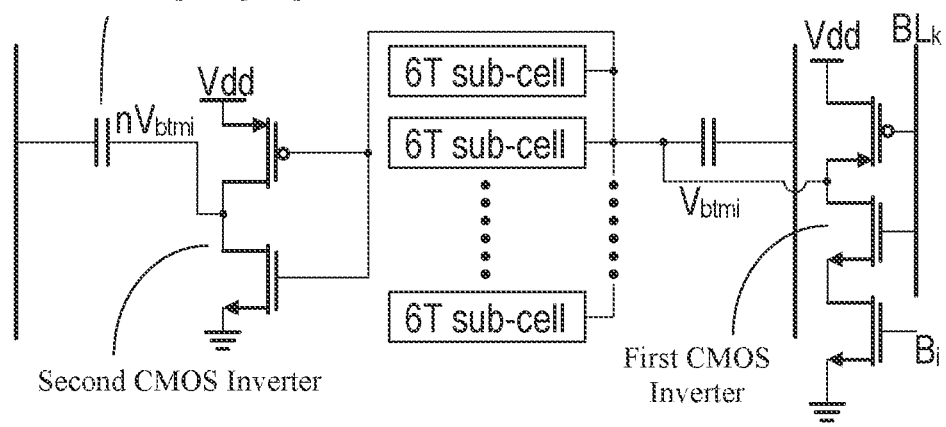
FIG. 6b is a schematic diagram illustrating a computing cell connected to a second CMOS inverter and a differential capacitor according to another embodiment of the present invention.
Figure 6C:
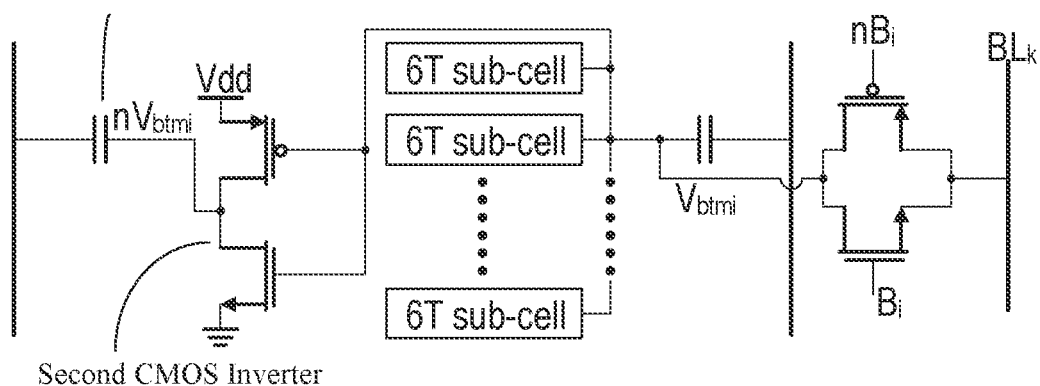
FIG. 6c is a schematic diagram illustrating a computing cell connected to a second CMOS inverter and a differential capacitor according to a further embodiment of the present invention.

A differential version of the MAC array architecture may be used to reduce computation errors. In some embodiments, the MAC array further includes second CMOS inverters and differential capacitors, as shown in FIGS. 6a, 6b and 6c. Each computing cell in the MAC array is connected to one of the second CMOS inverters and one of the differential capacitors so as to obtain the differential architecture of MAC array. Specifically, the complementary transmission gates of all the sub-cells in each computing cell are connected at their outputs to an input of a respective one of the second CMOS inverters, and an output of the respective second CMOS inverter is connected to a bottom plate of a respective one of the differential capacitors. Additionally, top plates of the differential capacitors in each column are connected to a respective differential accumulation bus. For ease of description, the structure in which such a computing cell constructed by sub-cells according to the above embodiments is connected to a second CMOS inverter and a differential capacitor is referred to as a differential cell. Accordingly, it will be appreciated that all the sub-cells within a differential cell commonly share one first NMOS transistor, one second NMOS transistor (FIGS. 6a and 6b), one PMOS transistor, one differential capacitor and one second CMOS inverter, and are activated in a similar time-multiplexed manner.

Figure 7:
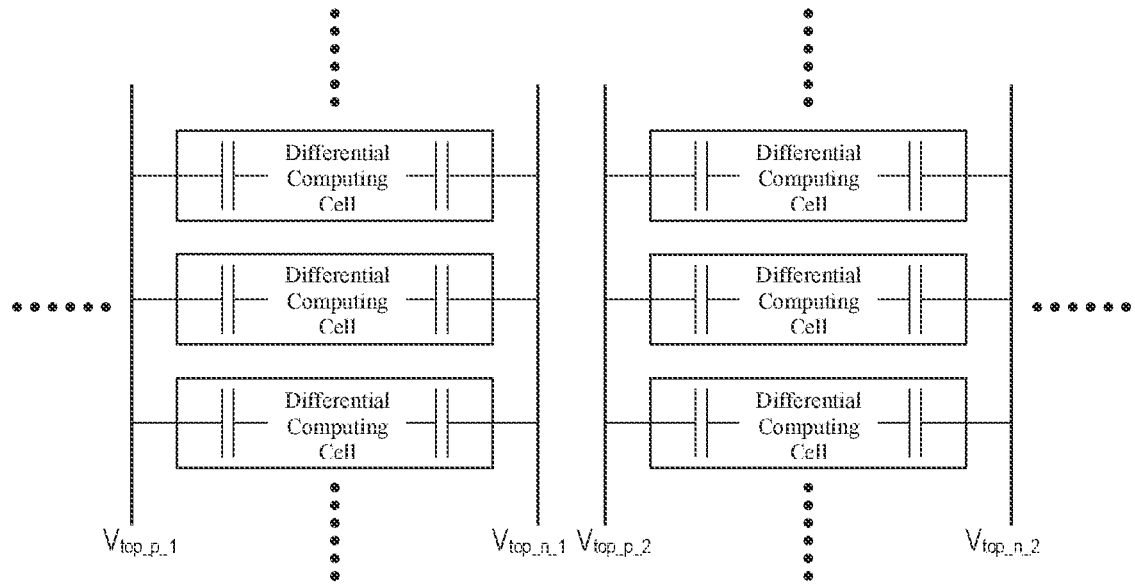
FIG. 7 is a schematic illustration of a differential MAC array architecture according to an embodiment of the present invention.

FIG. 7 shows a MAC array made up of differential cells as described above. In each of the differential cells, the output of each complementary transmission gate is connected to a bottom plate of a common computing capacitor. In each column, the top plates of all the computing capacitors are connected to a respective accumulation bus, and the top plates of all the differential capacitors are connected to a respective differential accumulation bus.

Figure 8:
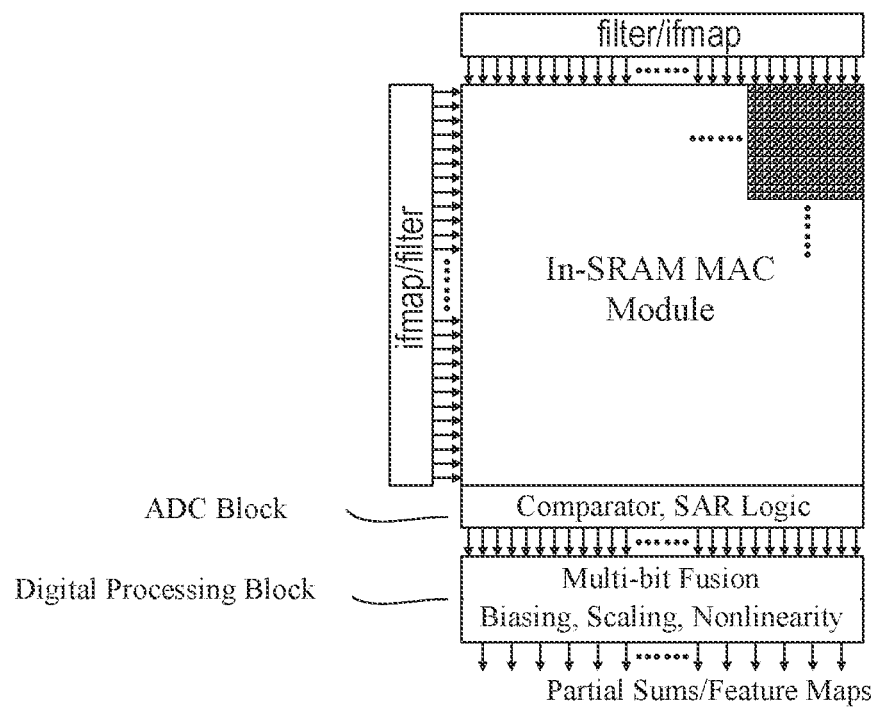
FIG. 8 is a schematic illustration of an in-memory computing module according to an embodiment of the present invention.

In a third aspect, there is provided a bit-width reconfigurable mixed-signal computing module. Referring to FIG. 8, it includes: the MAC array according to the second aspect or any possible implementation thereof, wherein column-wise accumulation results of MAC operations in the MAC array are represented in the form of analog voltages, i.e., the top plate voltages $V_{top}$ of the capacitors described in connection with the above embodiments; a filter/ifmap block for providing filter parameters (or computation results from the previous network layer in the case of a neural network, as will be appreciated) that are written into and stored in the MAC array; an ifmap/filter block for providing an input to the MAC array, more specifically, to the complementary transmission gates in the computing cells, which is subject to MAC operations with the filter parameters or the activations from the previous network layer, an ADC block for converting the analog voltages resulting from the MAC operations to their digital representations; and a digital processing block for performing at least multi-bit fusion, biasing, scaling or nonlinearity on the digital representations output from the ADC block and for outputting results in the form of partial sums or activations directly usable as an input to the next network layer.

It will be appreciated that, the module described herein, when used in a neural network to perform MAC operations, may be typically able to pre-load the necessary filter parameters (weights) at once because it contains more memory elements (i.e., cross-coupled CMOS inverter pairs) per unit area. After computation in one layer is completed, the output partial sums or final activations (feature maps) directly usable in computation in the next network layer can be immediately subject to MAC operations with the filter parameters (weights) pre-loaded and stored in the module, saving the time waiting for off-chip data movement and the power consumed therein as well. In addition, the high throughput of the module can improve on-chip storage capabilities. For example, apart from the filter parameters, the memory cells in the MAC array can also be used to store the output activations (feature maps) of the same network layer.

It will be appreciated that, in addition to the sharing of transistors and computing capacitors within the computing cells and MAC array as described above in the first and second aspects, in fact, the computing cells also share some transistors and other devices involved in the analog-to-digital conversion and digital processing in other regions of the module than the MAC array.

According to the present invention, the ADC block may be parallel capacitive SAR ADCs for converting the top plate voltages $V_{top}$ column-wise output from the computing cells to their digital representations. Each of the SAR ADCs may include a MAC DAC, a SAR DAC, a comparator, a switching sequence and SAR logic. Compared to SAR ADCs of other types such as resistive and hybrid resistive-capacitive, the parallel capacitive SAR ADCs allow more full utilization of the inventive structures, resulting in a reduced number of components and a reduced area. The MAC DAC is composed of the parallel capacitors in a respective column of computing cells in the MAC array. It will be appreciated that the output voltage of the MAC DAC is $V_{top}$. The SAR DAC includes (B+1) parallel capacitors and $B=\log_2 N$, where N is the number of capacitors in the MAC DAC. The capacitors include B capacitors with capacitances binarily decreasing from an MSB capacitor to an LSB capacitor and a redundant capacitor of the same capacitance as the LSB capacitor. As an example, when the number of capacitors in the MAC DAC is N=8, then B=3, the capacitance of the MSB capacitor $C_{B-1}$ is C, the capacitance of the second MSB capacitor $C_{B-2}$ is C/2, and the capacitance of the LSB capacitor $C_0$ is C/4. In this case, a reference voltage of the SAR DAC is allocated to the capacitors from the MSB one to LSB one respectively at ratios of 1/2, 1/4, 1/8, and the capacitance of the redundant capacitor $C_U$ is C/4. The B capacitors and the redundant capacitor are connected in parallel at one end, and the other ends of the B capacitors are connected to the switching sequence, with the other end of the redundant capacitor being always grounded Gnd. A free end of the switching sequence includes a VDD terminal and a ground terminal (Gnd). The SAR logic controls the switching sequence.

Figure 9:
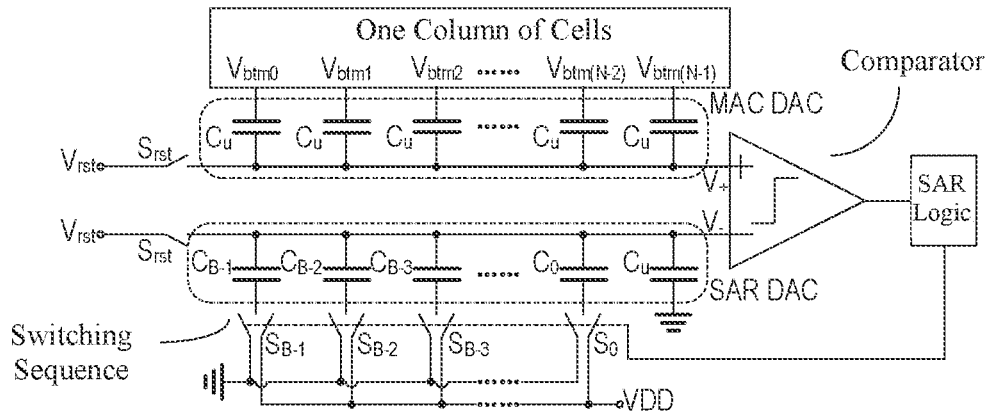
FIG. 9 is a schematic illustration of an ADC block according to an embodiment of the present invention.

In one embodiment, as shown in FIG. 9, the output voltage $V_{top}$ of the MAC DAC is taken as a positive input $V_+$ to the comparator, and an output $V_{SAR}$ of the SAR DAC is taken as a negative input $V_-$ to the comparator. The SAR logic controls the switching sequence to bring the negative input $V_-$ to approximate the positive input $V_+$. The final SAR logic output is the digital representation of $V_+$. In particular, the MAC array's activation sparsity may spare some capacitors in the SAR DAC from switching in order to obtain higher energy efficiency and analog-to-digital conversion speed. For example, if it is known that after a MAC operation, the portion of the MAC capacitors with the bottom plate voltages $V_{btmi}$ being VDD is less than 25%, i.e., among 1-bit multiplications in the respective column of computing cells in the MAC array, there are more 1x0, 0x0 and 0x1 cases, and the number of 1x1 cases is less than ¼ of the total case number, then $S_{B-1}$ and $S_{B-2}$ in the switching sequence that correspond to the first two MSBs capacitors of the SAR DAC, i.e., $C_{B-1}$ and $C_{B-2}$, may be switched to the ground terminal Gnd rather than unconditionally activating all the capacitors in the SAR DAC during digital-to-analog conversion. This can result in power savings. It is noted that the connection of the comparator's $V_+$ and $V_-$ sides shown in the figure is for ease of illustration, and in fact, the two sides may be swapped.

Figure 10:
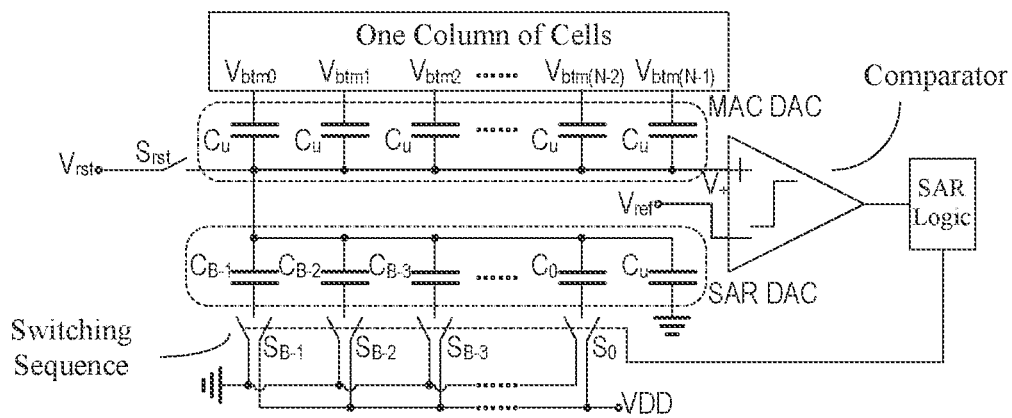
FIG. 10 is a schematic illustration of an ADC block according to another embodiment of the present invention.

In another embodiment, referring to FIG. 10, the MAC DAC and the SAR DAC may be connected together, thus connecting all the capacitors in parallel. In this case, a generated total voltage is taken as the positive input $V_+$ and $V_{ref}$ as the negative input $V_-$ to the comparator. The SAR logic controls the switching sequence to bring the positive input $V_+$ to approximate $V_{ref}$. It is noted that this embodiment is suitable for MAC operations that follow "Procedure I" as described above. If $V_{rst}=0$ and no circuit non-idealities are considered, $V_{ref}$ that is connected to the comparator's negative input $V_-$ may be either 0 or VDD/2. For example, if $V_{ref}=0$ and the capacitors in the SAR DAC are initially connected to VDD through the switches from $S_0$ to $S_{B-1}$, the SAR operation can bring $V_+$ back to 0 while giving the digital representation. This provides $V_{rst}=0$ as required by the step of resetting the top plate voltage $V_{top}$ of the capacitors to 0 through a reset switch $S_{rst}$ in "Procedure I".

Figure 11:
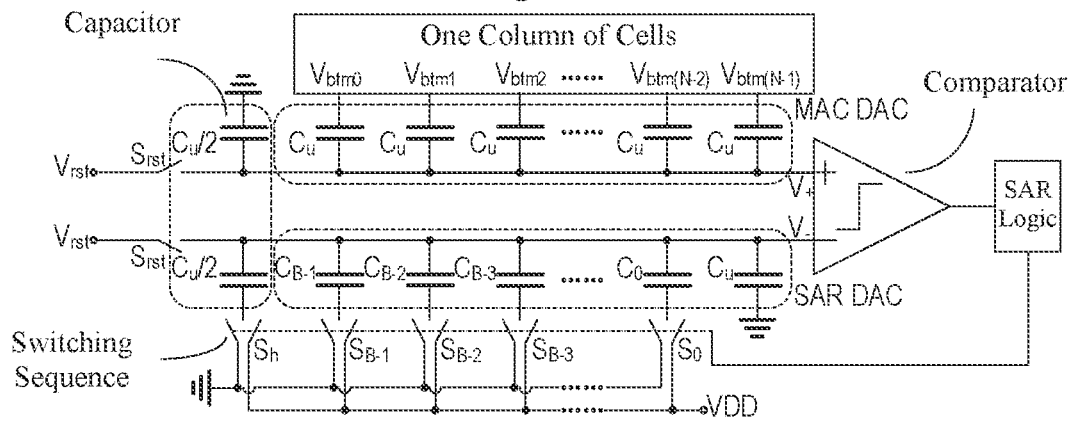
FIG. 11 is a schematic illustration of an ADC block according to a further embodiment of the present invention.

In the two embodiments shown in FIGS. 9 and 10, the comparator can easily suffer from the metastability problem during analog-to-digital conversion when the positive and negative inputs $V_+$ and $V_-$ of the comparator are infinitesimally close to each other. The metastability condition makes it impossible to differentiate the positive input $V_+$ from the negative input $V_-$ of the comparator during a short period of time because the analog MAC result that is to be quantized is not continuous in amplitude but discrete, and the discrete amplitude levels are aligned with the SAR DAC's. In order to alleviate this problem, in another embodiment as shown in FIG. 11, to each of the MAC DAC on the positive input $V_+$ side and the SAR DAC on the negative input $V_-$ side of the comparator, a half-LSB capacitor is added, which is connected in parallel with the other capacitors, in contrast to the architecture of FIG. 9. The other end of the half-LSB capacitor on the positive input $V_+$ side is always grounded Gnd, and the other end of the half-LSB capacitor on the negative input $V_-$ side may be connected to the switching sequence. This creates a half-LSB difference between the discrete analog voltage levels between the MAC DAC and the SAR. DAC, providing extra error tolerance. Each of the half-LSB capacitors may consist of two LSB capacitors in series for good matching.

Figure 12:
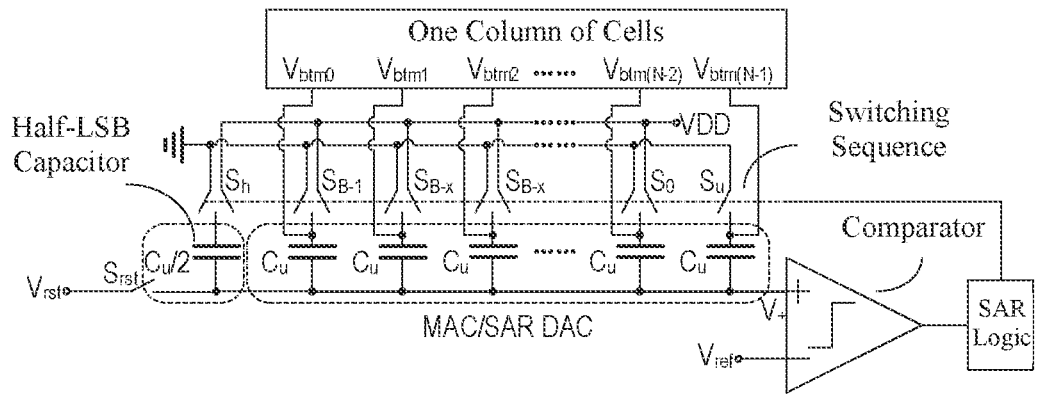
FIG. 12 is a schematic illustration of an ADC block according to a further embodiment of the present invention.

Another embodiment allows the reuse of the MAC DAC as the SAR DAC via bottom-plate sampling. As shown in FIG. 12, the positive input $V_+$ side of the comparator is connected to the MAC DAC and a half-LSB capacitor, in which both the capacitors in the first to (N−1)-th cells of the MAC DAC and the half-LSB capacitor may be connected to either the VDD terminal or ground terminal Gnd of the switching sequence, and the capacitor in the N-th cell may be selectively connected to the ground terminal Gad. The negative input $V_-$ side of the comparator is not connected to any capacitor but to the voltage $V_{ref}$. In fact, the MAC DAC according to this embodiment also serves as the SAR DAC. It should be noted that, according to this embodiment, "Procedure II" should be followed to perform MAC operations. Usually, $V_{ref}=T_{rst}$, and the comparator's positive input voltage $V_+$ goes back to $V_{rst}$ after the SAR conversion is complete. This provides $V_{rst}$ as required by the step of resetting the top plate voltage $V_{top}$ of the capacitors to $V_{rst}$ through a reset switch $S_{rst}$ in "Procedure II". In this way, both MAC operation and analog-to-digital conversion can be accomplished with a single capacitor array, avoiding mismatch and accuracy loss caused by the use of separate capacitor arrays for the MAC DAC for performing MAC operations and the SAR DAC for achieving analog-to-digital conversion and allowing the possibility of fully-differential SAR ADC. It is to be particularly noted that, in this embodiment, all the transistors required for the switching sequence are included within the control elements of the above-discussed computing cells and no additional transistors are required for the implementation of the switching sequence.

Figure 13:
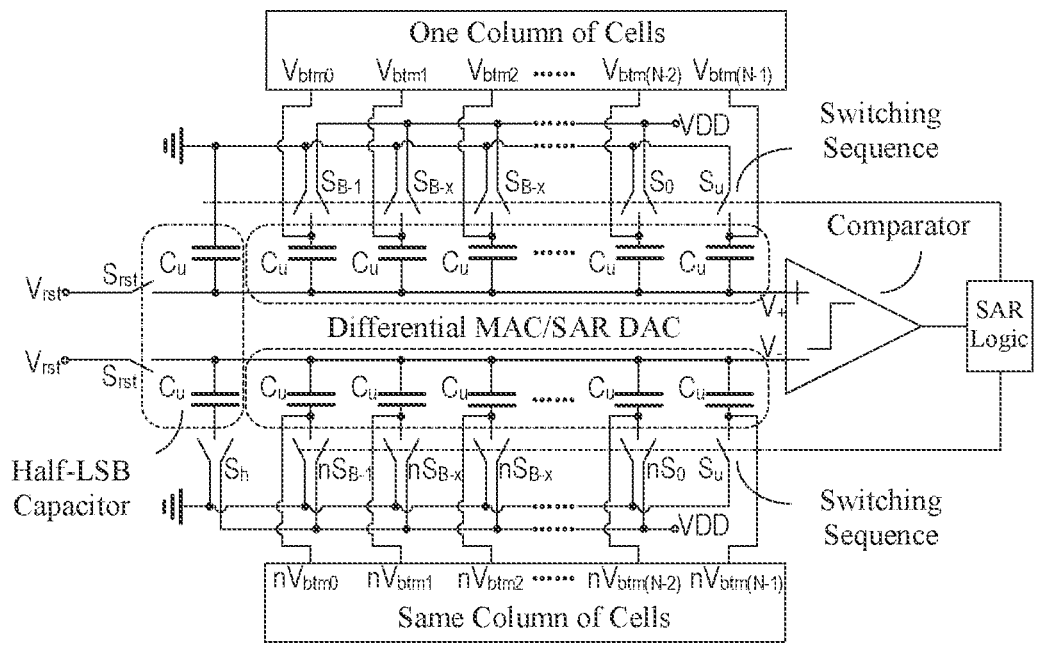
FIG. 13 is a schematic illustration of a differential ADC block according to a further embodiment of the present invention.

FIG. 13 shows a differential MAC architecture according to another embodiment based on the embodiment of FIG. 12, which solves the problem of common-mode dependent comparator input offset voltage. The positive input $V_+$ side of the comparator is connected to the MAC DAC and an additional LSB capacitor. During analog-to-digital conversion, both the capacitors in the first to (N−1)-th cells of the MAC DAC and the additional LSB capacitor may be connected to either the VDD terminal or ground terminal Gnd of the switching sequence, and the capacitor in the N-th cell may be selectively connected to the ground terminal Gnd. The comparator's negative input $V_-$ side is connected to both a differential MAC DAC and an additional LSB capacitor. During analog-to-digital conversion, both the capacitors in the first to (N−1)-th cells of the differential MAC DAC and the additional LSB capacitor may be connected to the switching sequence, and the capacitor in the N-th cell may be selectively connected to the ground terminal Gnd. The differential MAC DAC consists of a respective column of differential capacitors in the MAC array. It is noted that the implementation of this differential MAC architecture requires the aforementioned differential version. It is to be particularly noted that, in this embodiment, all the transistors required for the switching sequence are included within the control elements of the differential computing cells and no additional transistors are required for the implementation of the switching sequence.

Figure 14:
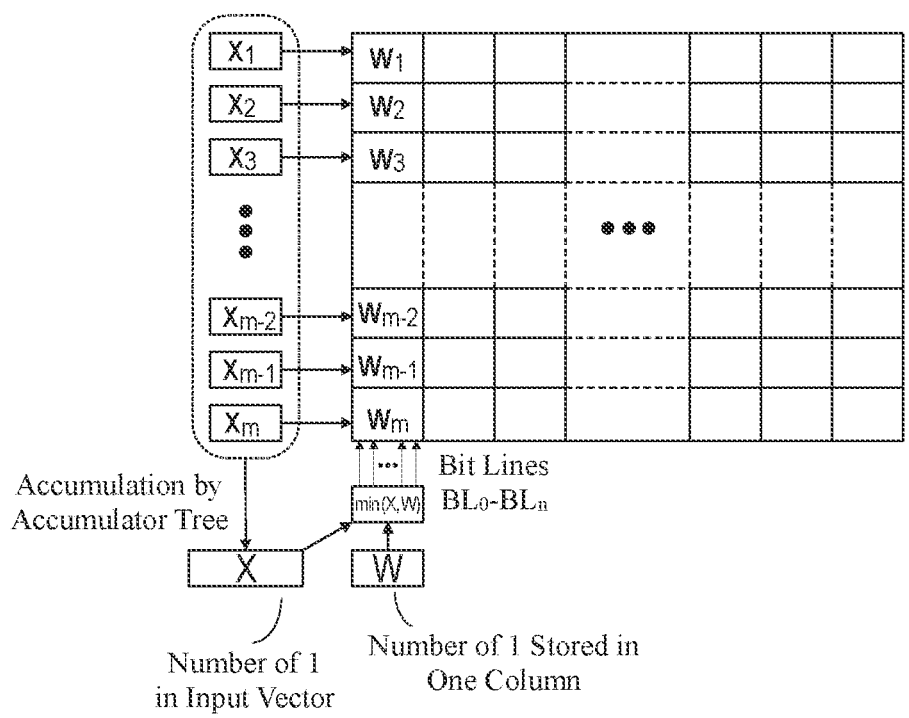
FIG. 14 schematically illustrates architecture with lower power consumption in analog-tip-digital conversion according to an embodiment of the present invention.

In one embodiment, the SAR ADC for each column has a bit-width that is determined in real time by the sparsity of input data and values stored in the column. In this way, the number of capacitors in the binarily weighted capacitor array that need to be charged or discharged during analog-to-digital conversion may be greatly reduced on average, thus significantly reducing the power consumed during analog-to-digital conversion. In particular, as shown in FIG. 14, the real-time bit-width of the SAR ADC may be expressed as $\text{ceil}(\log_2(\min(X, W)+1))$, where "ceil" is a ceiling function; "min" is a minimum function; X is the number of 1 within a 1-bit input vector, and $X_l$-$X_m$ represent the $X_l$-th to $X_m$-th 1-bit input vectors, which may be obtained using an accumulator tree; W is the number of 1 stored in one column of the computing array, and $W_l$-$W_m$ represent the numbers of 1 stored in sub-cells in the column, which may be obtained via off-chip computation and provided to the SAR logic before data storage of the computing array. The "min", "$\log_2$" and "veil" functions in the expression can be replaced with simple digital combinatorial logic, while the same computation result can be still obtained.

It is worth noting that the boundaries of the various blocks and modules included in the foregoing embodiments have been defined only based on their functional logic, and the present invention is not so limited, as alternate boundaries can be defined as long as the specified functions are appropriately performed. Also, specific names of the various functional components are intended to distinguish between these components rather than limit the scope of the present invention in any way. For example, the phrases "first NMOS transistor" and "second NMOS transistor" mentioned in the description of the above embodiments are only intended to distinguish between devices connected at different locations and should not be interpreted as referring to particular devices.

The foregoing description presents merely preferred embodiments of the present invention and is not intended to limit the scope of the present invention in any way. Any and all changes, equivalent substitutions, modifications and the like made within the spirit and principles of the present invention are intended to be embraced in the scope thereof.

The invention claimed is:
1. An in-memory mixed-signal computing sub-cell, configured for 1-bit multiplication; the in-memory mixed-signal computing sub-cell comprising a memory element, a computing capacitor and a control element, wherein the memory element comprises two cross-coupled CMOS inverters and a complementary transmission gate; the two cross-coupled CMOS inverters storing a 1-bit filter parameter; the complementary transmission gate comprising an NMOS transistor having a gate connected to an input signal; the complementary transmission gate further comprising a PMOS transistor having a gate connected to a complementary input signal; one of the CMOS inverters comprising an output connected to an input of the complementary transmission gate; the complementary transmission gate comprising an output connected to both a bottom plate of the computing capacitor and the control element, a multiplication result of the input signal and the 1-bit filter parameter stored as a voltage on the bottom plate of the computing capacitor, and a plurality of said in-memory mixed-signal computing sub-cells for forming a computing cell, the control element and the computing capacitor shared among all the in-memory mixed-signal computing sub-cells in the computing cell.

2. The in-memory mixed-signal computing sub-cell of claim 1, wherein the control element comprises a first NMOS transistor, a second NMOS transistor and a PMOS transistor; the first NMOS transistor having a source that is grounded, and a drain connected together with a drain of the second NMOS transistor and a drain of the PMOS transistor, each of the drain of the first NMOS transistor, the drain of the second NMOS transistor and the drain of the PMOS transistor being connected to the bottom plate of the shared computing capacitor; the first NMOS transistor having a gate provided with an input signal at a same voltage level during computation as a signal to which the gate of the PMOS transistor in the complementary transmission gate is connected; the second NMOS transistor having a source that is grounded, and a gate connected to a bit line; the PMOS transistor having a source connected to Vdd, and a gate connected to a further complementary bit line.

3. The in-memory mixed-signal computing sub-cell of claim 1, wherein the control element comprises a first NMOS transistor, a second NMOS transistor and a PMOS transistor; the second NMOS transistor and the PMOS transistor connected in series to form a first CMOS inverter; the PMOS transistor in the first CMOS inverter having a source connected to Vdd; the second NMOS transistor in the first CMOS inverter having a source connected to a drain of the first NMOS transistor; the first NMOS transistor having a source that is grounded, and a gate provided with an input signal at a same voltage level during computation as a signal to which the gate of the PMOS transistor in the complementary transmission gate is connected; the first CMOS inverter comprising an input connected to a bit line, and an output connected to the bottom plate of the computing capacitor.

4. The in-memory mixed-signal computing sub-cell of claim 1, wherein the control element comprises a first NMOS transistor and a PMOS transistor, the first NMOS transistor having a drain connected to a drain of the PMOS transistor and to the bottom plate of the computing capacitor, the first NMOS transistor having a source connected to both a source of the PMOS transistor and a bit line, the first NMOS transistor having a gate connected to a control word line at a same voltage level during computation as a signal to which the gate of the PMOS transistor in the complementary transmission gate is connected, the PMOS transistor having a gate connected to another control word line.

5. The in-memory mixed-signal computing sub-cell of claim 2, wherein the in-memory mixed-signal computing sub-cells in the computing cell are activated in a time-multiplexed manner where the signal to which the gate of the first NMOS transistor is connected is at a same voltage level as the complementary input signal connected to the gate of the PMOS transistor in the complementary transmission gate of the in-memory mixed-signal computing sub-cells that are active at a given time.

6. A multiply-accumulate (MAC) array, configured for performing MAC operations, the MAC array comprising the in-memory mixed-signal computing sub-cells of claim 5, wherein the MAC array comprises a plurality of computing cells, in each of which the outputs of the complementary transmission gates of all the in-memory mixed-signal computing sub-cells are connected to the bottom plate of the shared computing capacitor; wherein top plates of the shared computing capacitors in all the computing cells of each column are connected to a respective accumulation bus, and wherein a voltage on each accumulation bus corresponds to an accumulated sum of multiplication operation results of the respective column of the MAC array.

7. The MAC array of claim 6, further comprising second CMOS inverters and differential capacitors; wherein in each of the computing cells, the outputs of the complementary transmission gates of all the in-memory mixed-signal computing sub-cells are connected to an input of a respective one of the second CMOS inverters; and an output of the second CMOS inverter is connected to a bottom plate of a respective one of the differential capacitors; and wherein top plates of all the differential capacitors in each column are connected to a respective differential accumulation bus.

8. A bit-width reconfigurable mixed-signal in-memory computing module, comprising: the MAC array of claim 6, wherein column-wise accumulation results of multiplication results in the MAC array are represented as analog voltages; a filter/ifmap block, configured for providing filter parameters or activations from computation in a previous layer, which are written into and stored in the MAC array; an ifmap/filter block, configured for providing an input to the MAC array, the input being subject to MAC operations with the filter parameters or the activations from computation in the previous layer of a neural network; an analog-to-digital conversion (ADC) block, configured for converting the analog voltages from the MAC array to digital representations; and a digital processing block, configured for performing at least multi-bit fusion, biasing, scaling or nonlinearity on an output of the ADC block, and wherein outputting results in a form of partial sums or activations are usable as an input to a next network layer.

9. The computing module of claim 8, wherein the ADC block is successive approximation register (SAR) ADCs of a binarily weighted capacitor array, each SAR ADC comprising: a MAC digital-to-analog converter (DAC) consisting of the shared computing capacitors in a respective column of the MAC array; a SAR DAC, which is an array consisting of a plurality of binarily weighted capacitors and one redundant capacitor of a same capacitance as a least significant bit (LSB) capacitor therein; a comparator; a switching sequence; and SAR logic, configured for controlling the switching sequence.

10. The computing module of claim 9, wherein an output voltage of the MAC DAC is taken as an input to one end of the comparator, and an output voltage of the SAR DAC is taken as an input to the other end of the comparator.

11. The computing module of claim 9, wherein the MAC DAC and the SAR DAC are connected together such that the shared computing capacitors in the respective column of the MAC array, the plurality of binarily weighted capacitors and the redundant capacitor are connected in parallel, and wherein an output voltage generated by the shared computing capacitors in the respective column of the MAC array, the plurality of binarily weighted capacitors and the redundant capacitor is taken as an input to one end of the comparator, and a comparison voltage $V_{ref}$ is taken as an input to the other end of the comparator.

12. The computing module of claim 10, wherein each SAR ADC comprises a pair of half-LSB capacitors connected to respective ends of the comparator, and wherein an output voltage of the MAC DAC and one of the pair of half-LSB capacitors, which is connected in parallel with the MAC DAC, is taken as an input to one end of the comparator, and an output voltage of the SAR DAC and the other one of the pair of half-LSB capacitors, which is connected in parallel with the SAR DAC, is taken as an input to the other end of the comparator.

13. The computing module of claim 9, wherein the MAC DAC and a half-LSB capacitor are both connected to the switching sequence and reused as the SAR DAC, and an output voltage of the dual-use DAC is taken as an input to the end of the comparator, and wherein a comparison voltage $V_{ref}$ is taken as an input to the other end of the comparator.

14. The computing module of claim 9, wherein the SAR ADC further comprises a differential MAC DAC consisting of differential capacitors in a respective column of the MAC array.

15. The computing module of claim 14, wherein the MAC DAC and an additional LSB capacitor connected in parallel therewith are both connected to the switching sequence and reused as the SAR DAC, and an output voltage of the dual-use DAC is taken as an input to one end of the comparator, and wherein the differential MAC DAC and an additional differential LSB capacitor connected in parallel therewith are both connected to the switching sequence and reused as a differential SAR DAC, and an output voltage of the dual-use differential DAC is taken as an input to the other end of the comparator.

16. The computing module of claim 9, wherein a bit-width of the SAR ADC is determined in real time by a sparsity of input data and stored data in the MAC array, and is expressed as ceil (log $_2$(min (X,W)+1)), where ceil is a ceiling function, min is a minimum function, X is the number of 1 within a 1-bit input vector, W is the number of 1 stored in one column of the computing array, and the real-time bit-width calculation expression is equivalently implemented by digital combinatorial logic in circuitry.

17. The in-memory mixed-signal computing sub-cell of claim 3, wherein the in-memory mixed-signal computing sub-cells in the computing cell are activated in a time-multiplexed manner where the signal to which the gate of the first NMOS transistor is connected is at a same voltage level as the complementary input signal connected to the gate of the PMOS transistor in the complementary transmission gate of the in-memory mixed-signal computing sub-cells that are active at a given time.

18. The in-memory mixed-signal computing sub-cell of claim 4, wherein the in-memory mixed-signal computing sub-cells in the computing cell are activated in a time-multiplexed manner where the signal to which the gate of the first NMOS transistor is connected is at a same voltage level as the complementary input signal connected to the gate of the PMOS transistor in the complementary transmission gate of the in-memory mixed-signal computing sub-cells that are active at a given time.

19. A bit-width reconfigurable mixed-signal in-memory computing module, comprising: the MAC array of claim 7, wherein column-wise accumulation results of multiplication results in the MAC array are represented as analog voltages; a filter/ifmap block, configured for providing filter parameters or activations from computation in a previous layer, which are written into and stored in the MAC array; an ifmap/filter block, configured for providing an input to the MAC array, the input being subject to MAC operations with the filter parameters or the activations from computation in the previous layer of a neural network; an analog-to-digital conversion (ADC) block, configured for converting the analog voltages from the MAC array to digital representations; and a digital processing block, configured for performing at least multi-bit fusion, biasing, scaling or nonlinearity on an output of the ADC block, and wherein outputting results in a form of partial sums or activations are usable as an input to a next network layer.

* * * * *